May 14, 1963 J. H. BARNES 3,089,731
FLEXURE TYPE TIRE TRIM
Filed Jan. 24, 1961

INVENTOR.
JAMES H. BARNES
BY Oldham & Oldham
ATTYS.

United States Patent Office 3,089,731
Patented May 14, 1963

3,089,731
FLEXURE TYPE TIRE TRIM
James H. Barnes, 154 1st St., Wadsworth, Ohio
Filed Jan. 24, 1961, Ser. No. 84,534
5 Claims. (Cl. 301—37)

This invention relates to novel flexure type tire trims of the general type used for removable attachment to an automobile tire and wheel assembly for ornamenting and/or protecting the sidewall of the tire.

The present type of tire trim member is an improvement in and relates to the types of tire trim and protective members shown in my prior Patent No. 2,737,422. Such types of tire trims have gone into relatively wide commercial use and have found excellent acceptance in the trade for the protection and decoration of tire and wheel assemblies so as to simulate a tire with a white sidewall thereon by the use of the removable trim member provided by such previous patented construction.

The general object of this invention is to provide a novel and improved flexure type of a tire trim characterized by the special adhesive characteristics, or inherent capability of the tire trim member to adhere itself closely to the sidewall of the tire with which it is associated under all normal operating conditions.

A further object of the invention is to distribute the flexure stresses in a tire trim member of the class described and where only a radially inner edge of the tire trim is secured in position, as by being compressed intermediate a tire bead and a rim flange.

Yet another object of the invention is to provide a novel and improved flexure type tire trim made from a smaller amount of material than previous types of tire trims but yet having improved properties.

A further object of the invention is to provide a plurality of annular grooves or recesses on the inner surface of the tire trim as engaged with a tire and wheel unit, so as to provide a plurality of annular flexure zones at which the tire trim member may be deflected radially inwardly or outwardly of the tire and wheel assembly.

The foregoing and other objects and advantages of the present inveniton will be made more apparent as the specification proceeds.

Attention is now particularly directed to the accompanying drawings which illustrate one currently preferred embodiment of the present invention, and wherein.

When referring to corresponding members shown in the drawings and referred to in the specification, corresponding numerals are used to facilitate comparison therebetween.

Figure 1:
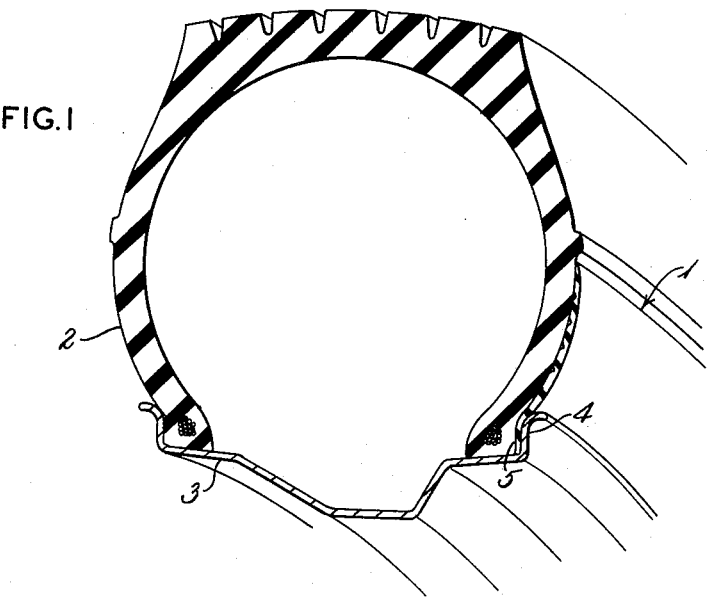
FIG. 1 is a perspective view, broken away and shown in vertical section, of a tire and wheel assembly having an embodiment of the invention operatively engaged therewith.

As previously indicated, the present invention relates to a flexure type tire trim of the class described and wherein this tire trim can be made from rubber or rubberlike materials or equivalent plastics and synthetic rubbers or the like and where such tire trim member has a radially inner portion adapted for engagement between a tire bead and a tire rim or wheel edge flange for securing the tire trim member thereto. The tire trim member also includes a plurality of annular, concentric grooves or recesses on its inner face as associated with the tire sidewall, which grooves or recesses are spaced radially appreciably from each other but provide a plurality of annular flexure zones at which the tire trim member of the invention is adapted to have flexure radially inwardly and outwardly of the tire trim member to facilitate close continuous engagement of the tire trim member with the tire sidewall so as to conform closely to the changing contour thereof under all normal operating conditions.

Attention now is particularly directed to the details of the structures shown in the accompanying drawings, and a tire trim of the invention is indicated as a whole by the numeral 1. This tire trim 1 is shown in operative engagement with the sidewall of a tire 2 that is operatively positioned on the rim portion 3 of a conventional wheel (not shown). This rim or peripheral portion of the wheel is provided with a tire engaging bead 4 at one margin thereof and a radially inner, or skirt portion 5 of the tire trim unit is shown operatively compressed between a bead of the tire 2 and the rim or wheel flange 4. Such engagement of the skirt 5 is normally provided by deflating the tire 2 and inserting the inner edge of the tire trim 1 intermediate the flange 4 and tire bead after which the tire is carefully reinflated and the tire bead squeezes out against a skirt portion 5 to affix the tire trim operatively to the tire and wheel assembly.

It should be realized that the tire 2 of the invention can be of any conventional construction and may or may not be a tubeless tire, as desired.

Figure 2:
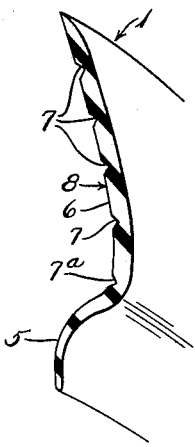
FIG. 2 is a slightly enlarged perspective view, broken away and shown in vertical section at one end thereof, of a tire trim member of the invention, as shown in its molded contour.

The previous patent referred to shows the generally concave molded contour for these tire trim members as originally provided and how a radially outer portion or decorative section 6 of the tire trim must be urged axially outwardly of the tire and wheel assembly when operatively positioned or engaged therewith. Such flexure normally has occurred primarily at the radially outer margin of the skirt 5 where it connects to the decorative section 6 that extends from or starts at the margin of the rim flange 4. Quite a concentration of stress and flexure occurs in this area of the tire trim members, as previously made. As an important feature of the present invention, a plurality of concentric, annular radially spaced grooves, or recesses 7 are provided in the axially inner surface 8 of this tire trim 1. The decorative portion 6 of the tire trim 1 may be made of varying axial thickness, and may taper to a feather edge at their radially outer margins, as shown in FIG. 2. However, regardless of the thickness of these decorative sections, the maximum flexure and stress normally set up in the trim member 1 when operatively engaged with the tire has been concentrated or localized particularly at the flange edge on the rim flange 4. It is believed that by the present invention, the tire trim 1 will have a plurality of annular bands each of which can absorb some of the flexure and stress set up in the tire trim 1 as operatively engaged with the tire sidewall, and the tire is inflated. Furthermore, under operative conditions of tire flexure, or when striking articles on the road, or on contacting the tire curb, etc. the tire trim 1 is adapted to have more localized flexure action so as to provide a structure which will cling closely to the tire sidewall under all normal operating uses.

Figure 4:
FIG. 4 is a fragmentary left side elevation of the tire trim member shown in FIG. 2.

As another feature of the tire trim 1, it can be strengthened and reinforced against excessive lateral deflection and any weakness occasioned by the rather thin construction of the axial thickness of the tire trim 1 in the decorative section 6 thereof by a plurality of circumferentially spaced, generally radially extending webs 9, 9 that can be formed integral with the tire trim 1 as a molded unit. These webs 9, as shown in FIG. 4, connect across the recesses, or grooves 7 provided in the axially inner surface 8 of the trim 1 to retain such tire trim to its normal molded contour and to strengthen the tire trim against excessive axially outward deflection or movement when in use.

By the use of a plurality of these grooves 7 in the tire trim 1, yet another additional feature is provided in that a smaller amount of material is used for forming the tire trim 1 but yet such tire trim has unexpected and desirable properties when in use. The tire trim normally is not weakened excessively by the provision of the grooves of the invention. As indicated, the tire trim 1 is of an integral, molded construction and normally is made from natural or synthetic rubbers, or equivalent materials.

Figure 3:
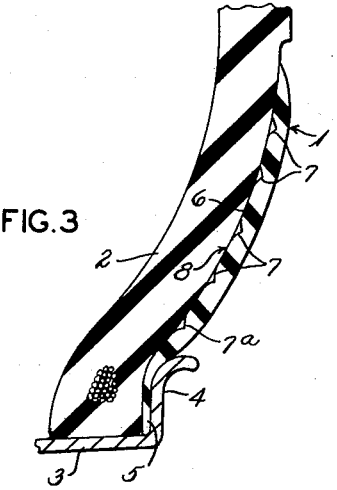
FIG. 3 is an enlarged fragmentary vertical section through the tire trim member of FIGS. 1 and 2 in operative engagement with a tire and wheel assembly.

These grooves, or annular recesses 7 as shown in the drawings, are of substantially V-shape in section, but if this sharp angle at the base of the groove is objectionable, they can be made more rounded or U-shaped in contour, but would be of greatest radial extent at their axially inner margins. Normally these grooves would only extend into the tire trim 1 approximately a fourth to one half of the thickness thereof. The grooves preferably, it is believed, should be spaced about two to five times the radial width of the widest portions of the groove 7 on the axially inner surface 3 of the tire trim 1. The grooves likewise should not start until the portion of the decorative section 6 of the trim member has extended appreciably radially outwardly of the margin of the wheel or rim flange 4, as shown in FIG. 3. Such spacing from the wheel flange 4 to the first groove 7a may be about one half to one times the distance between adjacent grooves. Usually the grooves would be of the same, or substantially the same size and shape. Usually the grooves 7 should be substantially evenly spaced throughout the entire radial length of this decorative section or portion 6 in the tire trim.

In the trim member 1 of the invention, in all events, preferably the side walls of the recesses 7 provided in the axially inner surface have diverging side walls whereby the recesses form peaks at their axially outer ends and with the recesses providing space for convenient flexure of adjacent sections provided in the tire trim by the recesses.

By comparing FIGS. 2 and 3 of the present drawings, as well as by referring to the drawings and description of my previously granted patent, it will be seen that quite some flexure or change in the shape of the tire trim 1 occurs from its original molded contour over to that required for operative engagement with a tire sidewall. FIG. 3 particularly shows the radially inner one of the recesses 7, indicated at 7a, is spaced radially outwardly from the periphery of the rim or wheel flange 4 about a distance equal to the distance between the adjacent convolutions or recesses 7. It furthermore is clearly indicated in the drawings that the recesses 7 terminate about the same distance from the radially outer periphery of the tire trim as the spacing between adjacent convolutions of the recesses provided. For best action in accordance with the teachings of the invention, it is thought that about four to six of these recesses should be provided in a tire trim and with the recesses making the same number of flexure zones to aid in distributing the change from the rather severe concave shape of the tire trim member as originally molded over to a much more concave shape when operatively positioned. A great amount of the flexure had occurred heretofore immediately at the engagement of the radially outer margin of the tire rim flange and the adjacent portion of the tire trim member, which portion of the tire trim member would be called the junction between the skirt portion and the decorative section or portion of the tire trim. The skirt portion is that which is engaged with the tire rim flange.

The tire trim, as molded, may have several centers for the molded contour, as shown in my prior patent, but it still is of greater concavity as molded than when in use.

By providing a plurality of these recesses, in a relatively thin tire trim member, it is surprising the percentage reduction in volume of material required for forming the tire trim 1. Hence the tire trim will have desirable and improved properties but yet can be produced at reduced cost. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What I claim is:

1. In a resilient protective and decorative sidewall trim adapted to be removably secured between a tire rim or wheel flange and a bead of a tire mounted on such tire rim, such sidewall trim comprising a radially inner skirt for compressive engagement between a tire rim flange and a tire bead, and a radially outer section for decorating and protecting the sidewall of a tire with which the sidewall is operatively engaged, said outer section having a molded shape with a concave axial inner surface and a convex outer surface, such molded concave shape being on a smaller radius than the general radius of curvature of a tire sidewall with which the tire trim is associated, said outer section having a plurality of radially spaced concentric annular recesses in its axial inner surface to provide a plurality of flexure areas in the tire trim, said recesses being of substantially U-shape in section and being spaced radially of each other a distance of about three to five times the depth of the recesses.

2. In a resilient protective and decorative sidewall trim adapted to be removably secured between a tire rim or wheel flange and a bead of a tire mounted on such tire rim, such sidewall trim comprising a radially inner skirt for compressive engagement between a tire rim flange and a tire bead, and a radially outer section for decorating and protecting the sidewall of a tire with which the sidewall is operatively engaged, said outer section having a molded shape with a concave axial inner surface and a convex outer surface, such molded concave shape being on a smaller radius than the general radius of curvature of a tire sidewall with which the tire trim is associated, said outer section having a plurality of concentric annular recesses in its axial inner surface to provide a plurality of flexure areas in the tire trim, said recesses having diverging side walls to provide space for flexure of adjacent sections of the tire trim and being radially spaced between about two to five times the maximum radial width of said recesses.

3. In a resilient protective and decorative sidewall trim adapted to be removably secured between a tire rim or wheel flange and a bead of a tire mounted on such tire rim, such sidewall trim comprising a radially inner skirt for compressive engagement between a tire rim flange and a tire bead, and a radially outer section for decorating and protecting the sidewall of a tire with which the sidewall is operatively engaged, said outer section having a molded shape with a concave axial inner surface and a convex outer surface, such molded concave shape being at a smaller radius than the general radius of curvature of a tire sidewall with which the tire trim is associated, said outer section having between about four to six concentric annular recesses in its axial inner surface to provide a plurality of flexure areas in the tire trim, all of said recesses being positioned radially outwardly of any wheel flange engaging portion of the sidewall, said recesses being of substantially V-shape in section, and reenforcing webs formed integrally with the tire trim and extending across said recesses in a generally radial direction at circumferentially spaced portions thereof.

4. In combination with a tire and wheel assembly where the wheel has a flange engaging the tire bead, a resilient protective and decorative sidewall trim removably secured between the wheel flange and the bead of the tire mounted on the wheel, such sidewall trim comprising a radially inner portion compressively engaged between the wheel flange and the tire bead, and a radially outer section for decorating and protecting the sidewall of a tire with which the sidewall is operatively engaged, said outer section having a molded shape with a concave axial inner surface and a convex outer surface, such molded concave shape being on a generally smaller radius than the general radius of the tire sidewall, said outer section having a plurality of concentric radially spaced annular grooves in its axial inner surface and spaced radially from said wheel flange to provide a plurality of flexure areas in the tire trim to facilitate its flexure into close resilient engagement with the tire sidewall, said grooves having diverging side walls that extend into said outer section between about one fourth to about one half the thickness thereof, said trim member having an inherent resiliency and such a relationship between said engaged inner portion and said outer section as to urge said outer section axially inwardly against the tire sidewall.

5. In a resilient protective and decorative sidewall trim adapted to be removably secured between a tire rim or wheel flange and a bead of a tire mounted on such tire rim, such sidewall trim comprising a radially inner skirt for compressive engagement between a tire rim flange and a tire bead, and a radially outer section for decorating and protecting the sidewall of a tire with which the sidewall is operatively engaged, said outer section having a molded shape with a concave axial inner surface and a convex outer surface, such molded concave shape being at a smaller radius than the general radius of curvature of a tire sidewall with which the tire trim is associated, said outer section having between about four to six concentric annular recesses in its axial inner surface to provide a plurality of flexure areas in the tire trim, all of said recesses being positioned radially outwardly of any wheel flange engaging portion of the sidewall, said recesses being of substantially V-shape in section to form a trim with deformable annular portions therein, which trim is made from a reduced amount of material by the provision of said recesses therein.

References Cited in the file of this patent

UNITED STATES PATENTS

| | | |
|---|---|---|
| 2,655,971 | Gross | Oct. 20, 1953 |
| 2,696,409 | Barnes | Dec. 7, 1954 |
| 2,737,422 | Barnes | Mar. 6, 1956 |
| 2,819,119 | Perrin | Jan. 7, 1958 |